May 25, 1926.
L. D. WOODRUFF
AIR LINE COUPLING
Filed Sept. 22, 1923
1,586,276
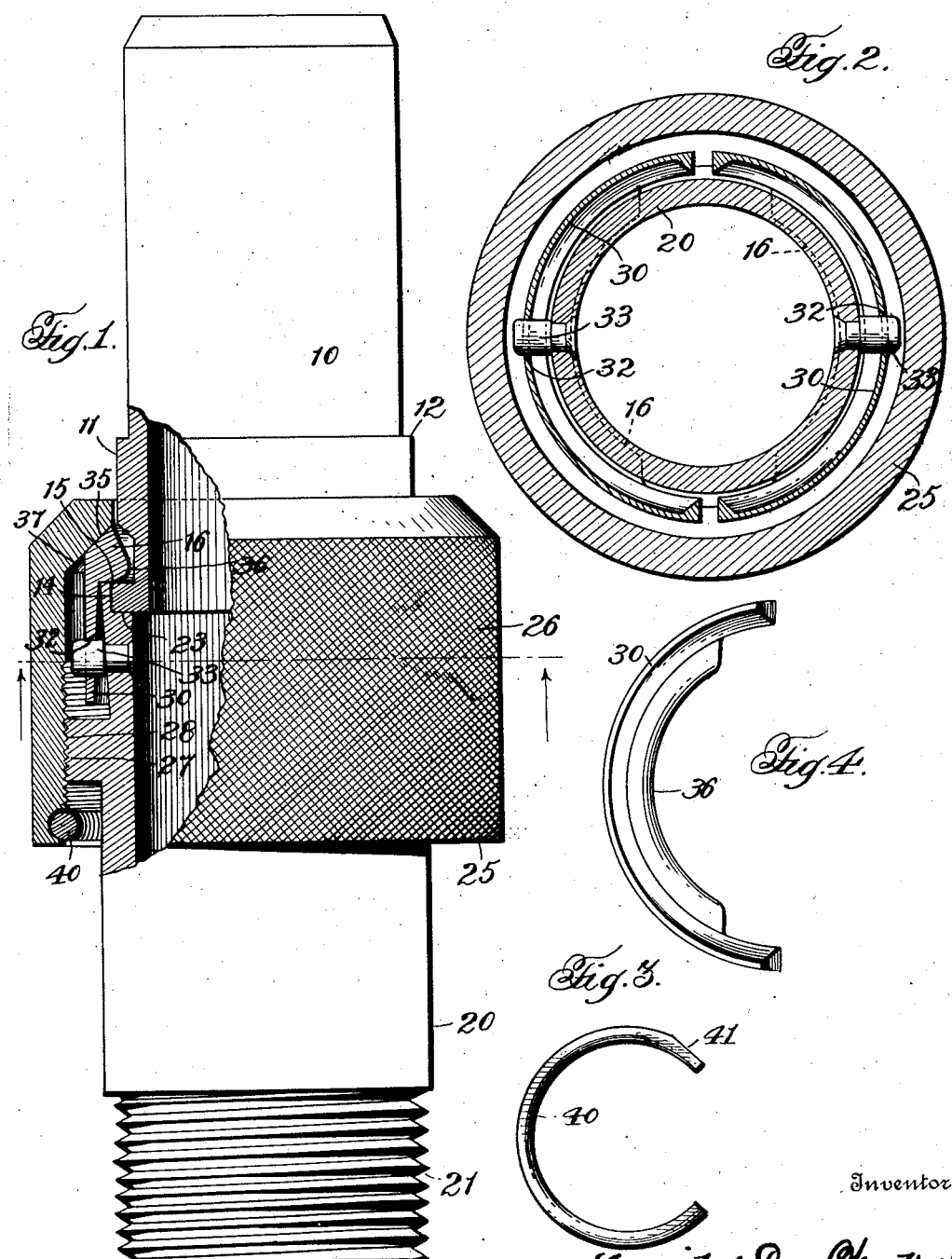
Inventor
Leonidas Doan Woodruff,
By Church & Church, HIS Attorneys
Witness
Jas. S. Hutchinson

Patented May 25, 1926.

UNITED STATES PATENT OFFICE.

LEONIDAS D. WOODRUFF, OF CHICAGO, ILLINOIS.

AIR-LINE COUPLING.

Application filed September 22, 1923. Serial No. 664,283.

This invention relates to couplings for securing together two lines of pipe, or more properly speaking, the fittings or nipples at the ends of the lines. The object of the present invention is to provide a simple form of coupling which will permit two air-lines to be quickly attached or detached and which will allow substantially free rotation of either line, thus preventing kinking of the hose.

The coupling here presented will find its principal field in joining a siphon jet body to a main line air hose in railway cars, so that a cleaning attachment may be secured to the main line air hose in a minimum of time, the coupling being so made that while it is substantially air-tight, the hose on the cleaning attachment may twist and turn as common, without any danger of kinking the line.

In the drawings,—

Figure 1 is an elevation of the coupling and the two fittings, partly in central section.

Fig. 2 is a section at right angles thereto.

Fig. 3 is a view of the locking spring.

The fitting 10 is of well known type, being very common in air-line trade. The annular rib 11 provides a shoulder 12 against which the rubber hose abuts and the somewhat similar and peripheral rib 14 provides a shoulder 15 against which the dogs 16 cam or wedge, the free face of the fitting 10 being machined to make a substantially air-tight joint with the member to which it is coupled.

The fitting at the end of the cleaning attachment hose is for convenience of description hereinafter termed the body and has a shank 21, either threaded or smooth, for attachment to the nipple or hose, depending upon which is used. At the top end of the body 20 is a counterbore forming a shoulder 23 which, like the face of the fitting 10, is machined to minimize escape of air between the fitting and body, which, as shown, are in substantially air-tight engagement.

The two members so far described are drawn into snug engagement with one another by means of the camming action of the dogs 16 as caused by the sleeve 25 which, as shown, is provided with a knurled surface 26 to facilitate screwing it down upon the siphon body 20, the sleeve being interiorly threaded as at 27 to fit a threaded portion 28 of the body here shown as a radially disposed ledge so as to provide clearance between the sleeve and body at each side of their threaded engagement.

As illustrated, there are but two dogs 16, this being the preferred number, although three or more dogs may be used, if desired. Each of the dogs is an arcuate member having a relatively thin web 30 preferably cylindrical on the outer surface and conical on the inner surface and being perforated as at 32 to receive loosely a pin 33 permanently secured to the siphon body 20.

At its upper corner the dog is beveled at an angle of 45° as at 35 and is provided in its inner surface with a gently rounded ledge 36 adapted to engage the shoulder 15 of the rib 14 of the fitting and to wedge this fitting down against the body 20. As shown in Fig. 2 the two dogs do not engage one another, as their function is in no way to add to the air-tightness of the joint save by their wedging action on the two fittings, and for this reason, too, I find it preferable to extend the curved ledges 36 only a portion of the extent of the dogs.

The cap or sleeve 25 has at its upper end an inwardly directed flange providing a cam surface 37 at the same angle as the upper outer edge of the dogs, thus driving the dogs inward as the sleeve is screwed down on the body. The locking spring 40 fits in an annular groove in the lower end of the sleeve and serves merely to prevent disassembly of the coupling by accident. One end of the locking spring, as 41, is beveled on its outer surface, thus providing a very convenient means for prying the spring out of the groove in the sleeve, when it is desired to separate the two fittings.

To assemble the coupling the cleaning attachment body 20 is held vertically and the two dogs placed in position over the two pins 33 which are diametrically opposite each other. It should be noted here that the sole purpose of the two pins is to keep the dogs from being lost from the coupling and that there is no wear or pull of any kind on either of the pins. The sleeve 25 is now placed on the siphon body and screwed slightly on. The outer surface of the upper portion of the body 20 is beveled inward, as shown at 44, so that the two dogs drop back against the sleeve and permit the insertion into the sleeve of the fitting 10. Continued screwing down of the sleeve forces the dogs inward into engagement with the shoulder 15 of the fitting 10 and causes this fitting to bind firmly in its shouldered seat in the body. The sleeve may, without any difficulty, be screwed down by hand to a sufficient tightness and when properly assembled the locking spring is pushed into place, snapping into proper position without trouble. With the device so assembled, there is a very easy turning of either of the fittings with respect to the other, the two machined surfaces permitting this turning, while still preserving substantial air-tightness of the joint. It will be noted that there is no relative movement of the dogs and sleeves or of the dogs and the body, all relative movement being between the fitting 10, and the body and dogs.

What I claim is:

1. An air line coupling adapted to secure together in rotatable manner a pair of hose fittings comprising a hose nipple having a marginal shoulder, a counterbored body receiving said shoulder, a cam member engaging the end of the body and the shoulder of the fitting, and a sleeve having a threaded engagement with said body, said sleeve being spaced from the body and enclosing said cam and having a camming engagement with said cam member at one limit of its travel on said body.

2. In a coupling adapted to fit an air-line sleeve, a body having a threaded shoulder thereon, a plurality of arcuate dogs each having a beveled outer end face, and an internally threaded cap engageable with said body and having a cam surface engaging the outer end face of the dogs to cause them to move inward to bind said sleeve, said cap being spaced from the body and enclosing said dogs between said shoulder and said cam surface.

3. In a coupling adapted to fit a double shouldered air-line sleeve, a body having an annular threaded flange, a plurality of arcuate dogs each having an inwardly extending ledge to engage the groove between the two shoulders of the air line sleeve, and a beveled outer face, and an internally threaded cap engageable with said flange, said cap being spaced from the body and enclosing the dogs and having a cam surface engaging the outer face of the dogs to cause them to move inward to bind said sleeve, said cam surface being inwardly directed and said dogs being located between said surface and said threaded flange.

4. In a coupling adapted to fit an air-line sleeve, a body having a radially extending flange, a plurality of arcuate dogs spaced around said body each having a beveled outer face, means for attaching said dogs to said body and an internally threaded cap engageable with said flange and having a cam surface engaging the outer face of the dogs to cause them to move inward to bind said sleeve, said cap being spaced from the body and enclosing said dogs.

5. In a coupling adapted to fit an air-line sleeve, a body, a plurality of arcuate dogs loosely attached to said body and each having a beveled outer face, and an internally threaded cap carried by said body and having a cam surface engaging the outer face of the dogs, said cap being adjustable longitudinally of the body to cause the dogs to move inward to bind said sleeve.

6. A siphon body for an air hose coupling comprising a tube counterbored at one end to receive a standard fitting, a threaded portion spaced from said counterbored end, a dog guiding and retaining pin between said threaded portion and the counterbored end, a dog on said pin and a threaded cap carried by the threaded portion of the body and adjustable longitudinally of the body for moving the dog radially of the tube.

7. A siphon body for an air hose coupling comprising a tube counterbored at one end to receive a standard fitting, a threaded portion spaced from said counterbored end, dog guiding and retaining pins secured to the portion of the tube intermediate said threaded portion and the counterbored end, a dog on each pin, a threaded cap carried by the threaded portion and adjustable longitudinally of the body for moving the dogs radially inwardly of the tube, said intermediate portion of the tube being tapered to permit radial expansion of the dogs.

LEONIDAS D. WOODRUFF.